United States Patent [19]
Dubose

[11] Patent Number: 5,386,880
[45] Date of Patent: Feb. 7, 1995

[54] SELF-PROPELLED GROUND EFFECT MACHINE

[76] Inventor: Ralph K. Dubose, 4226 Milton St., Houston, Tex. 77005-2470

[21] Appl. No.: 209,267

[22] Filed: Mar. 14, 1994

[51] Int. Cl.⁶ ............................................. B60V 1/14
[52] U.S. Cl. .................................................. 180/117
[58] Field of Search ............... 180/116, 117, 120, 121, 180/122

[56] References Cited

U.S. PATENT DOCUMENTS 2,972,327  2/1961  Paul ..................... 180/117

FOREIGN PATENT DOCUMENTS

| 2397963 | 3/1979 | France ........................ | 180/117 |
| 2162776 | 6/1972 | Germany ..................... | 180/117 |
| 1184096 | 4/1970 | United Kingdom .......... | 180/117 |

Primary Examiner—Kenneth R. Rice
Assistant Examiner—Kevin Hurley
Attorney, Agent, or Firm—Bill B. Berryhill

[57] ABSTRACT

A self-propelled ground effect machine having an elongated body, on the underside of which is an air plenum chamber, and a motor driven fan for directing air flow to the air plenum chamber and for propelling the machine across land or water. The fan is disposed in a cylindrical shroud whose flow axis is generally parallel with the longitudinal axis of the elongated machine body. The axis of the shaft of the rotating fan is mounted at an inclined angle relative to a vertical plane passing through the longitudinal axis of the machine. A splitter device directs part of the air flow into the air plenum chamber and part generally rearwardly of the machine.

12 Claims, 4 Drawing Sheets

SELF-PROPELLED GROUND EFFECT MACHINE

BACKGROUND OF THE INVENTION

1. Field of the Invention

The present invention pertains to self-propelled ground effect machines. More specifically, the present invention pertains to the mounting of motor-driven fans which provide air to support the machine and to propel it across land or water.

2. Description of the Prior Art

Ground effect machines, sometimes referred to a hovercraft, have existed for many years. These machines are vehicles for traveling across land or water which are supported above the surface of land or water on a cushion of air produced by one or more fans. Air from the fans is directed to a plenum chamber provided on the underneath side of the vehicle body. A flexible skirt of some type is provided around the plenum chamber to allow air to exhaust peripherally from the plenum chamber and skirt for support and to permit the vehicle to traverse on uneven terrain or choppy water. The fan supplies enough air to lift the vehicle on the cushion of air provided from the plenum chamber.

Air also supplies the power necessary for propulsion of the vehicle across land or water. The air for propelling the ground effect machine may be provided by the same fan which provides air to the plenum chamber or by another fan. In many cases, particularly with light ground effect machines, some type of air splitter or flow control device is provided which directs part of the air from a single fan to the air plenum chamber and part toward the rear of the vehicle for the propulsion thereof. Examples of ground effect machines may be seen in U.S. Pat. Nos. 3,687,217; 3,931,864; 4,666,012 and 4,828,058.

Fans, due to the angled disposition of the blades thereof, generate considerable twisting or spiralling of the air stream generated thereby. The percentage of kinetic energy expended on twisting or spiraling depends to a great extent on the number and spacing of fan blades and their pitch angle. The twisting or spiralling of the air stream from a fan has several undesirable consequences for small ground effect machines. The countertorque reaction of the fan acting along the elongated axis of the body thereof tends to induce roll along that axis. Energy is wasted due to the fact that air flow is not directed straight to the rear of the machine but at an angle from the longitudinal axis. Increasing air flow from a fan of a given diameter and rotational speed, requires more fan blades and more pitch and results in more twisting of the air stream, resulting in further inefficiencies and turbulence in the duct or shroud of the fan.

Various means have been used to try to straighten the flow of air from the fans of ground effect machines and to reduce the torque reaction and turbulence downstream thereof. Most of these efforts have been to provide some type of stator blades directly downstream of the fan blades to straighten the air and reduce torque reaction and turbulence thereof. While these methods are to various degrees effective, improvements are still needed.

SUMMARY OF THE PRESENT INVENTION

In the present invention a self-propelled ground effect machine or vehicle has an elongated body on the underside of which is an air plenum chamber which when provided with sufficient air flow will support the machine on a cushion of air above the surface of land or water across which the machine is to be propelled. The machine is provided with a motor-driven fan assembly for directing air flow to the air plenum chamber and generally rearwardly of the machine to propel the machine in a forwardly direction. The motor-driven fan means includes a generally cylindrical shroud or duct having a flow axis which is generally parallel with the longitudinal axis of the elongated body and a fan which includes a plurality of radially projecting fan blades for rotation within the shroud. The fan is attached to one end of a shaft which is in turn connected to the motor for rotation thereof. Unique to the present invention, the shaft is mounted so that its axis, relative to a vertical plane passing through the longitudinal axis of the elongated body, lies at an inclined angle therewith.

In a preferred embodiment of the invention, the ground effect machine is also provided with air splitter means mounted within the fan shroud on the downstream side of the fan providing a general, horizontal surface below which a portion of air flow of the fan is directed to the air plenum chamber and above which a portion of the air flow from the fan is directed rearwardly of the machine for propulsion thereof. Due to the fact that the shaft is mounted at an angle, air flow generally above the splitter means is straightened for direct flow to the rear of the machine and air flow below the splitter means is angled or directed more efficiently toward the air plenum chamber. Thus, the twisting or spiralling of thrust air flow is lessoned and counter-reacting torque on the machine's body is essentially eliminated producing greater stability of the machine and the thrust produced by the fan is increased. Many other objects and advantages of the invention will be apparent from reading the description which follows in conjunction with the accompanying drawings.

DESCRIPTION OF PREFERRED EMBODIMENTS OF THE INVENTION

Figure 1:
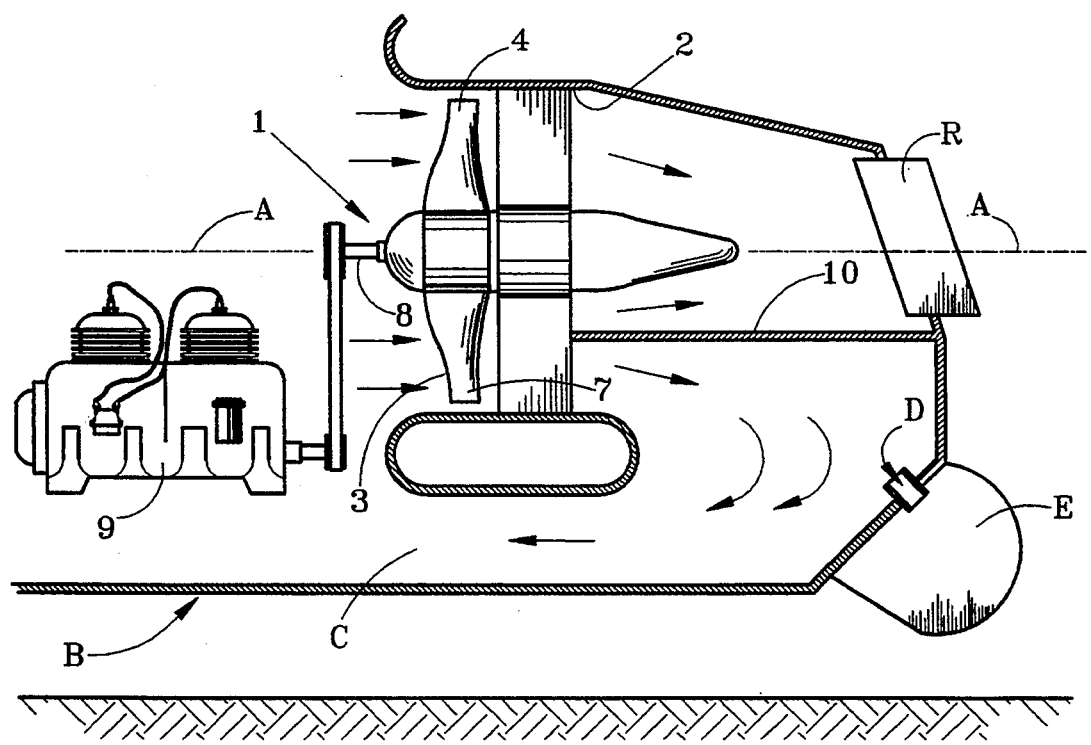
FIG. 1 is a schematic representation in elevation, of the rear portion of a self-propelled ground effect machine of the prior art.
Figure 2:
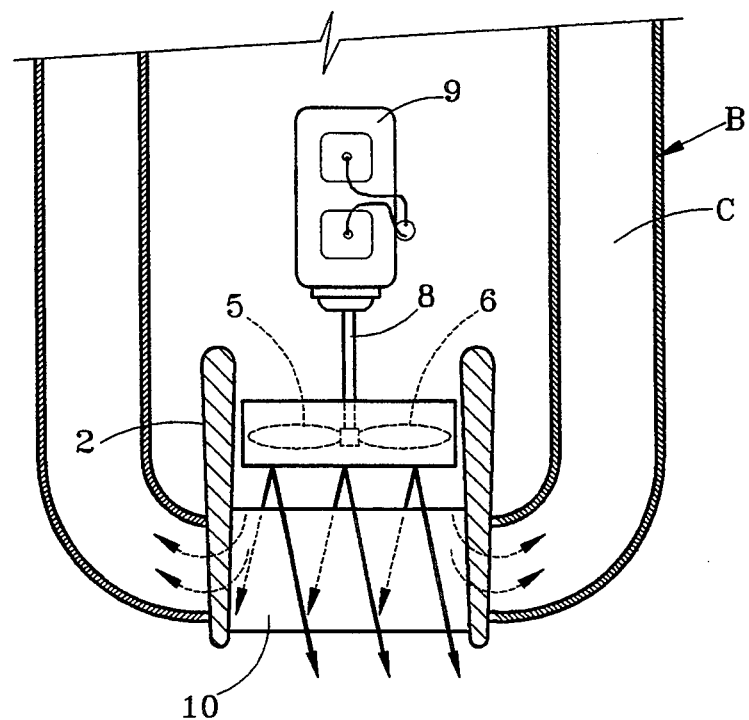
FIG. 2 is a longitudinal view, partially in section, of the fan assembly of a self-propelled ground effect machine, of the prior art.
Figure 3:
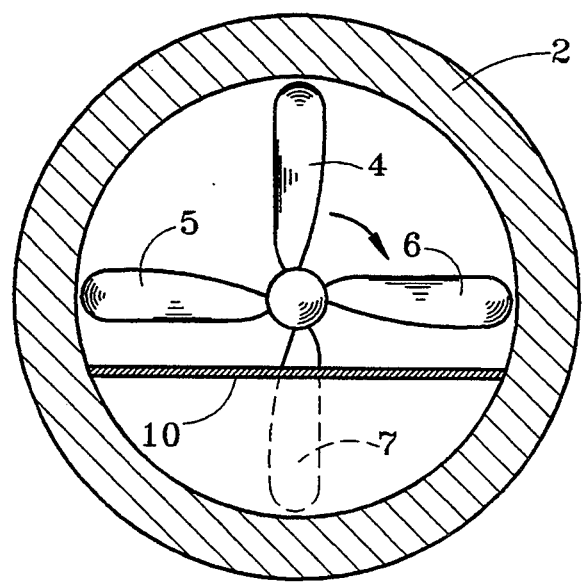
FIG. 3 is a rear elevation view of the fan assembly of the prior art of FIG. 2.

Referring first to FIGS. 1, 2, and 3 there is shown the rear of a self-propelled ground effect machine having an elongated body B on the underside of which is an air plenum chamber C. The longitudinal axis of the body B is represented at A—A. Air in the plenum chamber C communicates through holes D with bag-like skirt segments or elements E for eventual peripheral exhaust therefrom.

Mounted in the rear of the machine is a motor-driven fan assembly 1 which is shown as a motor-driven fan assembly of the prior art. It is provided with a generally cylindrical shroud or duct 2 having a flow axis which coincides with or at least is generally parallel with longitudinal axis A—A of the elongated body B. Mounted and supported by stators in the shroud 2 for rotation therein is a fan 3 which includes a plurality of radially projecting fan blades such as fan blades 4, 5, 6 and 7 shown in FIG. 3. The fan blades 4, 5, 6, 7 of the fan 3 are attached to the end of a shaft 8 and the opposite end of the shaft is attached to a motor or engine 9 (by belts and pulleys or other means) for rotating the shaft 8 and consequently the fan 3. The axis of the shaft 8 coincides or is parallel to the axis A—A of the elongated body B.

Fairly standard practice for self-propelled ground effect machines, particularly small ground effect vehicles or hovercraft, is the provision of a generally horizontally disposed splitter plate 10 in the fan shroud or duct 2 downstream of the fan 3. The splitter plate 10 which can be flat or curved to improve air flow divides the flow of air from the fan 3 into two portions. Approximately 30% of the air, below the splitter plate 10, is directed, by ducting, downwardly into the plenum chamber C to provide the cushion of air which supports the machine above the surface of ground or water across which the machine is to be propelled. The 70% of the air exiting the shroud or duct 2 above the splitter plate 10 provides forward thrust by which the machine is propelled in a forwardly direction. A rudder R may be provided in the air flow above the splitter plate 10 to aid in steering the vehicle.

Assuming that the fan 3 is one which rotates in a clockwise direction, as viewed from FIG. 3, and the pitch of the fan blades are such as to provide rearwardly directed air flow, several things occur. Air above the splitter plate 10 exits the shroud or duct 2 in an angular direction indicated by the solid line arrows of FIG. 2. Air flow below the splitter plate 10 exits at an angle indicated by the dotted line arrows of FIG. 2. This action produces countertorque reaction of the machine along its longitudinal axis. Propulsive energy is wasted since the air flow above the splitter plate 10 is not directly parallel with the axis of the machine. Increased power of a motor or engine 9 is required due to the inefficiency of the air flow. Increased power results in greater twisting and potentially increased turbulence downstream of the fan 3.

Figure 4:
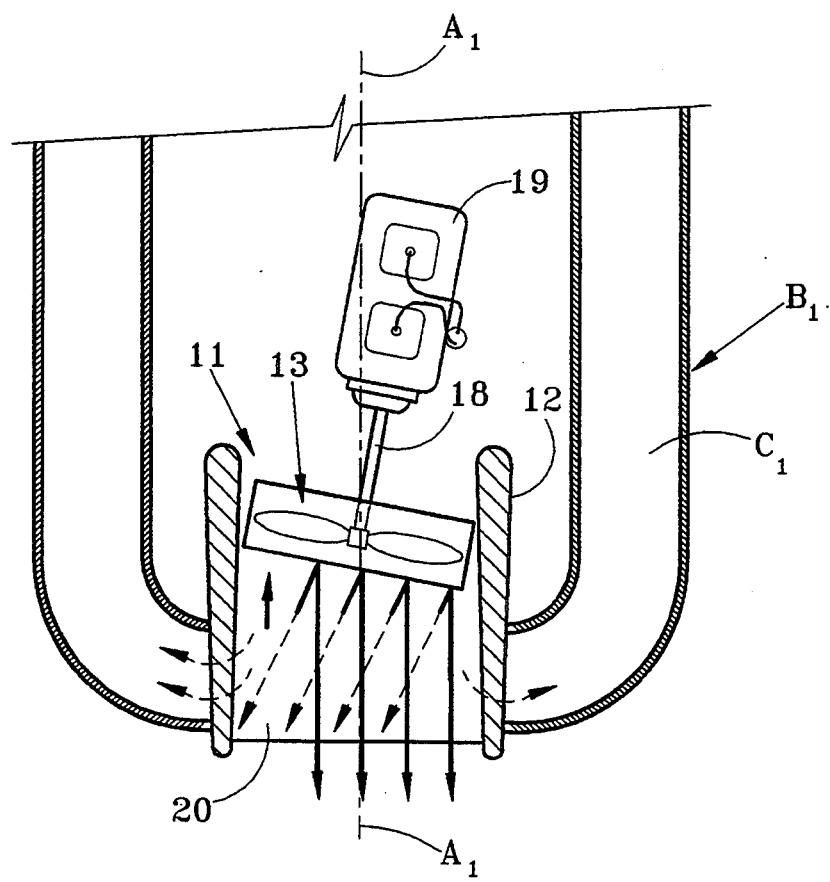
FIG. 4 is a longitudinal sectional view of a fan assembly of a self-propelled ground effect machine, according to a preferred embodiment of the invention.

Referring now to FIG. 4, there is shown a self-propelled ground effect machine having an elongated body $B_1$ on the underside of which is an air plenum chamber $C_1$ which is provided with an improved fan assembly 11, according to a preferred embodiment of the invention. The fan assembly 11 includes a generally cylindrical shroud or duct 12 having a flow axis which is generally parallel with the longitudinal axis $A_1$—$A_1$ of the elongated body $B_1$. A fan 13 (with a plurality of radially projecting fan blades) is mounted for rotation within the shroud 12. The fan is attached to one end of a shaft 18 and the opposite end of the shaft is attached to a motor or engine 19 for rotating shaft 18 and the fan 13. A very important distinction between the fan assembly 11 of the present invention and the fan assembly 1 of the prior art (FIGS. 1, 2 and 3) is the mounting of the shaft 18. The shaft 18 is mounted so that its axis, relative to a vertical plane passing through the longitudinal axis $A_1$—$A_1$ of the elongated body $B_1$ lies at an inclined angle therewith.

In a preferred embodiment of the invention the fan assembly 11 also includes an air splitter means or plate 20 which is mounted within the shroud or duct 12 on the downstream side of the fan 3 providing a generally horizontal surface below which a portion of air flow of the fan 3 is directed to the air plenum chamber $C_1$ and above which a portion of the air flow of the fan is directed rearwardly of the machine. In fact, the air flow above the splitter plate 20, rather than being at an angle as in the prior art design of FIGS. 1, 2 and 3, is more directly toward the rear of the machine so that this air flow provides forward propulsion force without loss of efficiency thereof. Furthermore, the air flow below the splitter plate 20 is more directly and forwardly routed to the air plenum chamber $C_1$ since its path, as indicated by the dashed lines of FIG. 4, more nearly coincides with the air plenum chamber $C_1$.

As regards the air flow below the splitter plate, the challenge has always been to redirect the fan output by approximately 180 degrees with as little energy loss as possible. About 40% loss is normal. The usual prior art practice has been to have air below the plate go into a larger space to slow it down as it turns. This larger space is always found under and to the sides of the fan duct. This locates the thrust line for propulsion and control high up—which is undesirable.

With the present invention, better rerouting can be accomplished, even with the fan mounted lower in the craft. The more the fan twists the air flow (below the splitter plate) the more favorable the angles are, especially with the lower quadrant. Here, the compensatory angulation of the fan is added to the twisting. The bulk of the air would enter the plenum space $C_1$ needing to be turned maybe 140 degrees, as opposed to all of it needing to be turned 180 degrees, as is usual with the prior art.

Figure 5:
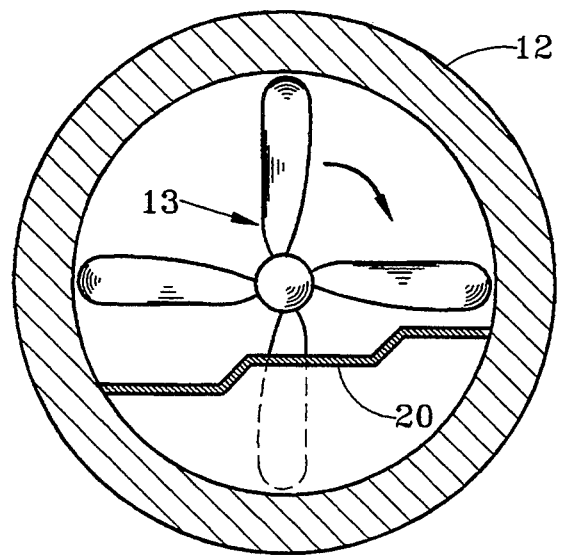
FIG. 5 is a rear elevation view of the fan assembly of FIG. 4, according to a preferred embodiment of the invention.

It will be noted that the edge of the splitter plate 20 farthest from the fan 13 is generally perpendicular to the longitudinal axis $A_1$—$A_1$ of the elongated body $B_1$ and that the edge of the splitter means 20 nearest the fan 13 is generally perpendicular to the axis of the inclined shaft 18. As indicated, the splitter plate 20 provides a generally horizontal surface. However, as illustrated in FIG. 5, it may be curved upwardly or downwardly on the opposite sides thereof to produce various air flow patterns, depending on the characteristics of the fan 13. Mildly curved splitter plates are in common use to reduce turbulence. With the present invention, a steeply angled and/or curved splitter plate would augment splitting off only fan output that was most favorably angled to begin with.

The fan 13, when viewed from the downstream side thereof, is depicted as rotating in a clockwise direction. Thus, the inclined angle of the shaft with the vertical plane through the longitudinal axis $A_1$—$A_1$ is to the right thereof. However, if the fan were one which rotated in a counter-clockwise direction, as viewed from the rear of FIG. 4, the inclined angle of the shaft would be to the left of the vertical plane.

Figure 6:
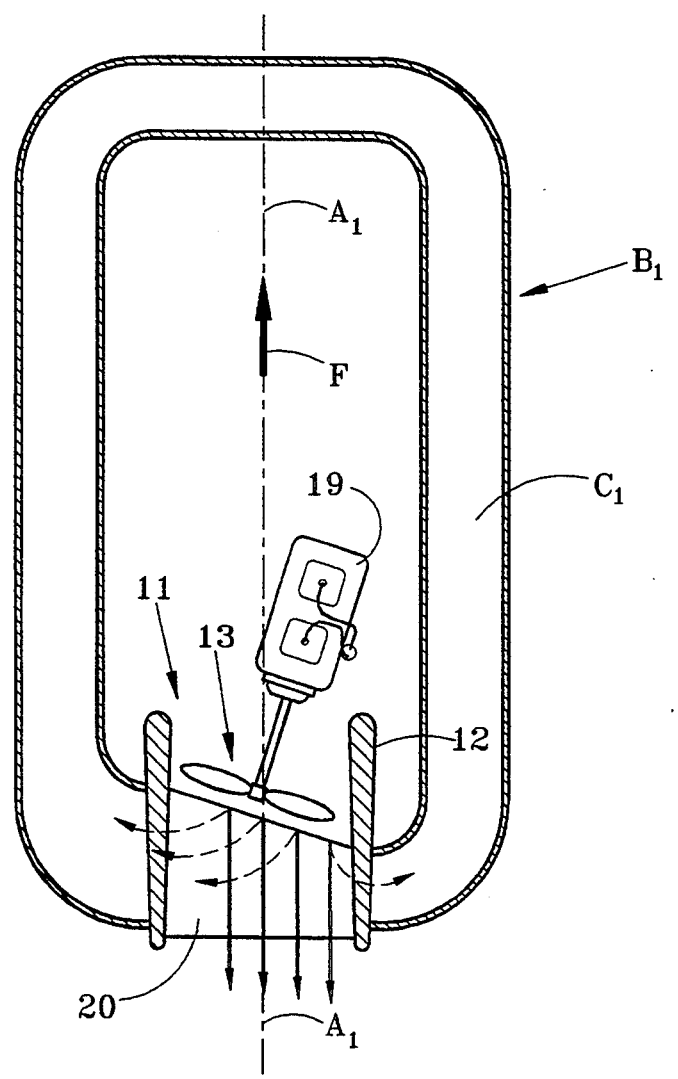
FIG. 6 is a plan view of a ground effect machine utilizing a fan assembly according to a preferred embodiment of the present invention.

FIG. 6, in a very simplified manner, illustrates a self-propelled ground effect machine or vehicle such as the one illustrated in FIG. 4, forward movement of the vehicle being represented by the arrow F. There are a number of advantages of this configuration. Air flow above the splitter plate which provides forward thrust to the machine is, on the whole, straighter with respect to the elongated axis $A_1$—$A_1$ of the vehicle, thus increasing the effectiveness and balance of lateral acting control surfaces. Air flow above the splitter plate is inherently straighter in relationship to the shroud or duct 12 and so is less prone to turbulence. Forward thrust is more efficient because air flow from the fan blades themselves is more parallel to the long axis of the craft, not just downstream of flow straighteners. Torque reaction through the engine for twisting the air flow would be exerted at an angle of several degrees off the long axis of the craft, thus largely eliminating its tendency to induce roll along that axis. Air flow below the splitter plate (dashed lines) may be more efficiently rerouted to the front of the craft because air flow from the fan enters the plenum space $C_1$ at an angle more inclined toward the front of the craft. The fan 13 could be mounted lower in the craft for better stability. Fans or propellers with multiple blades and high pitch, normally quieter for given the amount of thrust, would be more advantageous for this configuration because the more the air flow is twisted by the fan, the less additional change of direction is needed to reach the front of the craft. This advantage is compounded by the fact that the angulation, relative to the long axis of the craft $A_1$—$A_1$, of air entering the plenum space $C_1$ below the splitter plate 20 is approximately twice the angulation of the fan shaft needed to straighten the air flow above the splitter plate.

Figure 7:
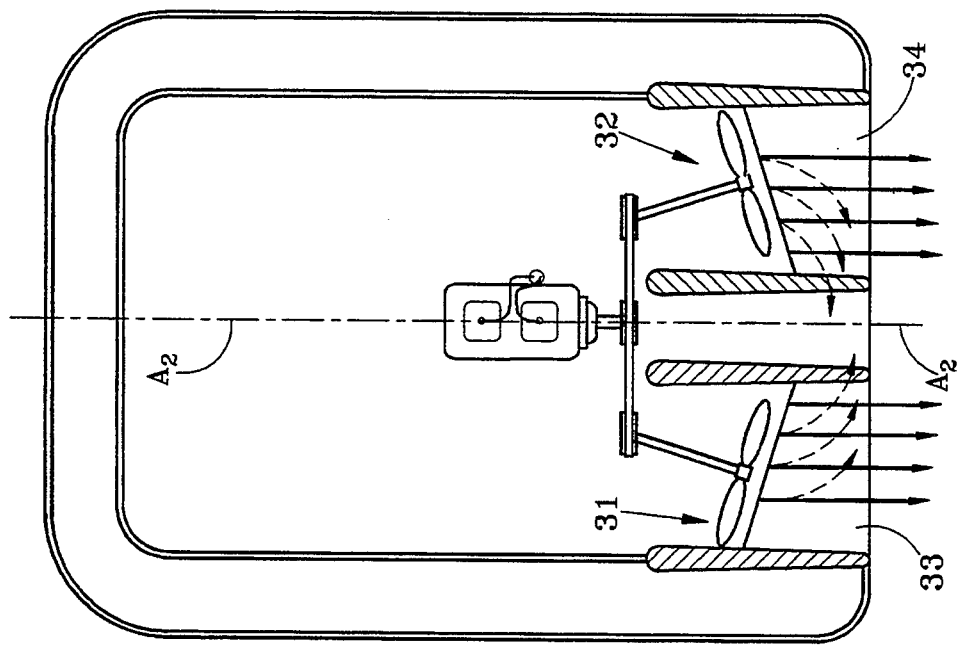
FIG. 7 is a plan view of another ground effect machine utilizing a pair of fan assemblies, according to another preferred embodiment of the invention.
Figure 8:
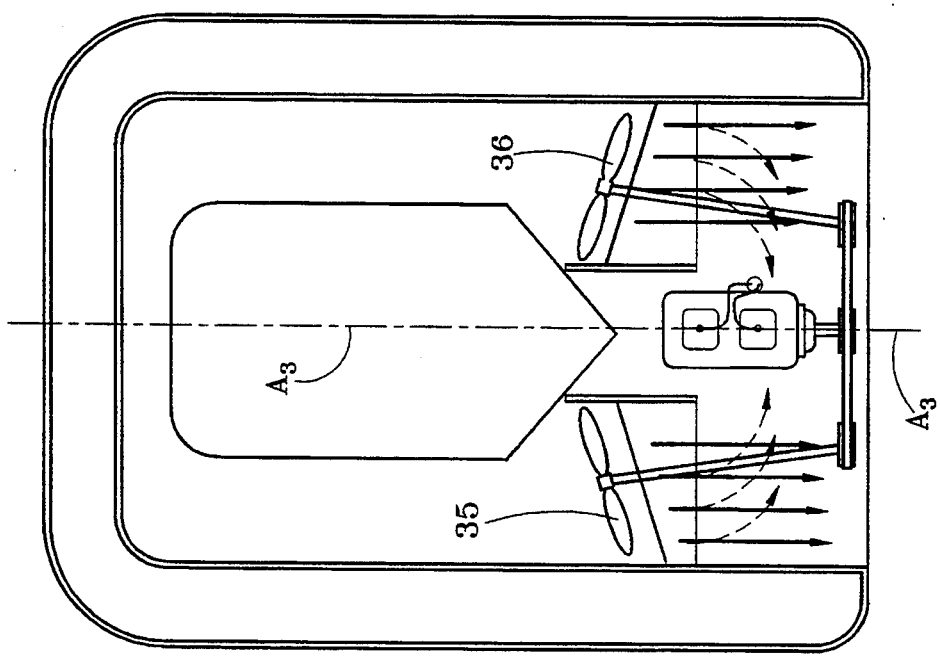
FIG. 8 is a plan view of another ground effect machine utilizing a pair of fan assemblies, according to still another embodiment of the invention.

While the invention has been described with a single fan configuration, it would especially be suitable for twin fan configurations illustrated in FIGS. 7 and 8. In such installations the fans would be counter-rotating. For example, one of the fan assemblies 31 of FIG. 7 might be a clockwise rotating fan assembly while the other fan assembly 32 would be a counter-clockwise rotating one. Thus, air above the splitter plates 33 and 34 would be directed straight toward the rear of the craft for propulsion and air below the splitter plates would be directed to respective sides of the plenum chamber in more direct paths. These fans 31, 32 could be driven by a single engine or motor mounted on the elongated axis $A_2$—$A_2$ of the craft. In this way the engine is out of the path of air flow through the fan assemblies. In the embodiment of FIG. 8, the engine and associated drive gear would be mounted at the extreme rear of the craft behind the fans 35, 36 and would be completely out of the rear air stream. This would provide a quieter environment for occupants of the craft and perhaps a larger payload thereon.

Thus, the self-propelled ground effect machine of the present invention is one in which the fan shaft is uniquely mounted so that it lies at an inclined angle with a vertical plane passing through the longitudinal axis of the machine. The machine is also provided with air splitter means providing a generally, horizontal surface below which a portion of air flow the fan is directed to an air plenum chamber and above which a portion of the air flow is directed rearwardly out of the machine for propulsion thereof. Due to the fact that the shaft is mounted at an angle, air flow generally above the splitter means is straightened for direct flow to the rear of the machine and air flow below the splitter means is angled or directed more efficiently toward the air plenum chamber. Twisting or spiraling and counter-reacting torque of the machine's body is substantially reduced or eliminated producing greater stability out of the machine and greater forward thrust thereto.

Several embodiments of the invention have been described herein. Many variations of the invention can be made without departing from the spirit of the invention. Accordingly, it is intended that the scope of the invention be limited only by the claims which follow.

I claim:

1. A self-propelled ground effect machine having an elongated body on the underside of which is an air plenum chamber which when provided with sufficient air flow will support said machine on a cushion of air above the surface of ground or water across which machine is to be propelled and motor driven fan means carried by said body for directing air flow to said air plenum chamber and generally rearwardly of said machine to propel said machine in a forwardly direction characterized in that said motor driven fan means comprises:

a generally cylindrical shroud having a flow axis which is generally parallel with the longitudinal axis of said elongated body;

a fan which includes a plurality of radially projecting fan blades for rotation within said shroud;

motor means for rotating said fan; and a shaft one end of which is connected to said motor means for rotation thereby and to which is attached said fan for rotation thereof, said shaft being mounted so that its axis, relative to a vertical plane passing through said longitudinal axis of said elongated body, lies at an inclined angle therewith.

2. A self-propelled ground effect machine as set forth in claim 1 including air splitter means mounted within said shroud on the downstream side of said fan providing a generally horizontal surface below which a portion of air flow of said fan means is directed to said air plenum chamber and above which a portion of air flow of said fan means is directed rearwardly of said machine.

3. A self-propelled ground effect machine as set forth in claim 2 in which the edge of said splitter means farthest from said fan is generally perpendicular to said longitudinal axis of said elongated body, the edge of said splitter means nearest said fan being generally perpendicular to said inclined shaft axis.

4. A self-propelled ground effect machine as set forth in claim 1 in which said fan, when viewed from the downstream side thereof, rotates in a clockwise direction, said inclined angle of said shaft being to the right of said vertical plane.

5. A self-propelled ground effect machine as set forth in claim 1 in which said fan, when viewed from the downstream side thereof, rotates in a counter-clockwise direction, said inclined angle of said shaft being to the left of said vertical plane.

6. A self-propelled ground effect machine having an elongated body on the underside of which is an air plenum chamber which when provided with sufficient air flow will support said machine on a cushion of air above the surface of ground or water across which said machine is to be propelled and motor driven fan means carried by said body for directing air flow to said air plenum chamber and generally rearwardly of said machine to propel said machine in a forwardly direction characterized in that said motor driven fan means comprises:

a pair of generally cylindrical shrouds having flow axes which are generally parallel with the longitudinal axis of said elongated body and on opposite sides thereof;

a pair of fans each of which include a plurality of radially projecting fan blades for rotation within a respective one of said shrouds;

motor means for rotating said fans; and a pair of shafts one end of each of which is connected to said motor means for rotation thereby and to which is attached a respective one of said fans for rotation thereof, each of said shafts being mounted so that its axis, relative to a vertical plane passing through said longitudinal axis of said elongated body, lies at an inclined angle therewith, one of said shafts being inclined in one direction away from said vertical plane and the other of said shafts being inclined in an opposite direction away from said vertical plane.

7. A self-propelled ground effect machine as set forth in claim 6 in which one of said fans, when viewed from the downstream side thereof rotates in a clockwise direction and the other of said fans, when viewed from the downstream side thereof, rotates in a counter-clockwise direction.

8. A self-propelled ground effect machine as set forth in claim 7 in which said motor means is mounted generally along said longitudinal axis of said body and generally out of the flow of air to and from said fans.

9. A self-propelled ground effect machine as set forth in claim 8 in which said motor means is mounted forwardly of said fans.

10. A self-propelled ground effect machine as set forth in claim 8 in which said motor means is mounted rearwardly of said fans.

11. A self-propelled ground effect machine as set forth in claim 7 including air splitter means mounted within each of said shrouds on the downstream side of its respective fan providing a generally horizontal surface below which a portion of air flow from said respective fan is directed to said air plenum chamber and above which a portion of said air flow from said respective fan is directed rearwardly of said machine.

12. A self-propelled ground effect machine as set forth in claim 11 in which the edges of said splitter means farthest from its respective fan is generally perpendicular to said longitudinal axis of said elongated body, the edges of said splitter means nearest its respective fan being generally perpendicular to a corresponding one of said pair of shafts.

* * * * *